(12) United States Patent
Uchio et al.

(10) Patent No.: US 6,252,991 B1
(45) Date of Patent: *Jun. 26, 2001

(54) IMAGE PROCESSING APPARATUS AND METHOD FOR DISPLAYING IMAGES

(75) Inventors: Hirokazu Uchio, Tokyo; Tadashi Yoshida, Ichikawa, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/497,984

(22) Filed: Jul. 3, 1995

(30) Foreign Application Priority Data

Jul. 7, 1994 (JP) .................................... 6-155979

(51) Int. Cl.[7] .............................. G06K 9/36; H04B 1/66; G09G 3/36
(52) U.S. Cl. .............. 382/236; 375/240.25; 375/240.01; 345/97
(58) Field of Search .................................. 382/236, 232; 348/403, 19, 409, 699, 495, 423; 358/432, 433; 386/81, 124; 345/100, 98, 97; 375/240.01, 240.13, 240.25

(56) References Cited

U.S. PATENT DOCUMENTS

| 4,367,924 | | 1/1983 | Clark et al. ........................... 350/334 |
| 4,655,561 | * | 4/1987 | Kanbe et al. .......................... 350/350 |
| 5,091,723 | * | 2/1992 | Kanno et al. ........................... 345/97 |
| 5,150,432 | * | 9/1992 | Ueno et al. ........................... 382/250 |
| 5,377,051 | * | 12/1994 | Lane et al. ........................... 386/124 |
| 5,436,636 | * | 7/1995 | Nonoshita et al. ................... 345/100 |
| 5,565,921 | * | 10/1996 | Sasaki et al. ........................ 348/409 |
| 5,977,945 | * | 11/1999 | Ohshima .............................. 345/100 |

* cited by examiner

Primary Examiner—Wenpeng Chen
(74) Attorney, Agent, or Firm—Fitzpatrick, Cella, Harper & Scinto

(57) ABSTRACT

The invention intends to efficiently detect a changed portion for a previous picture plane from image data encoded by using a correlation among a plurality of picture planes. To accomplish the above object, the invention has a detection unit for detecting a changed portion for a previous picture plane from the image data encoded by using a correlation among a plurality of picture planes and an output unit for outputting the image data of the portion detected by the detection unit to a display apparatus.

13 Claims, 15 Drawing Sheets

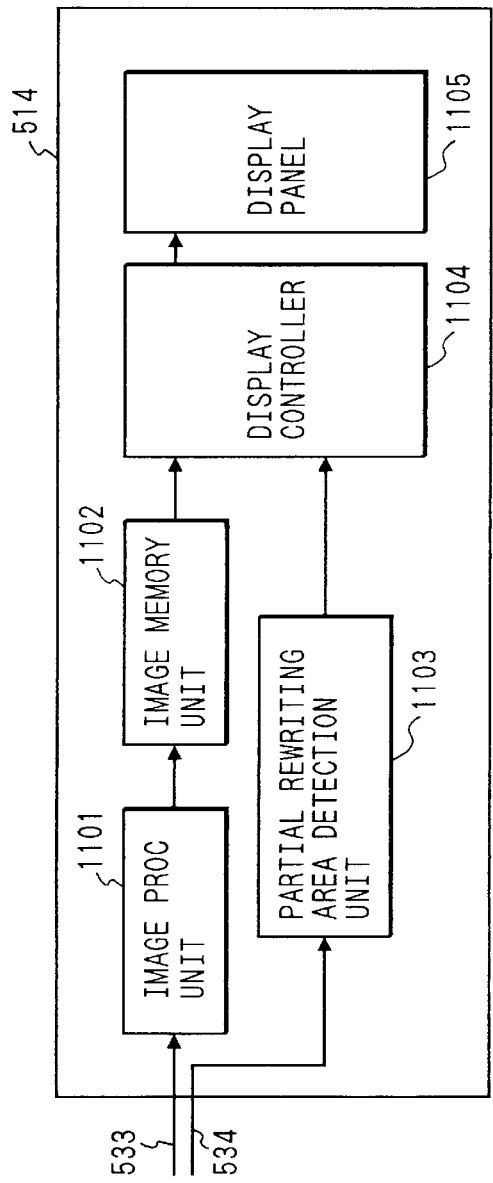
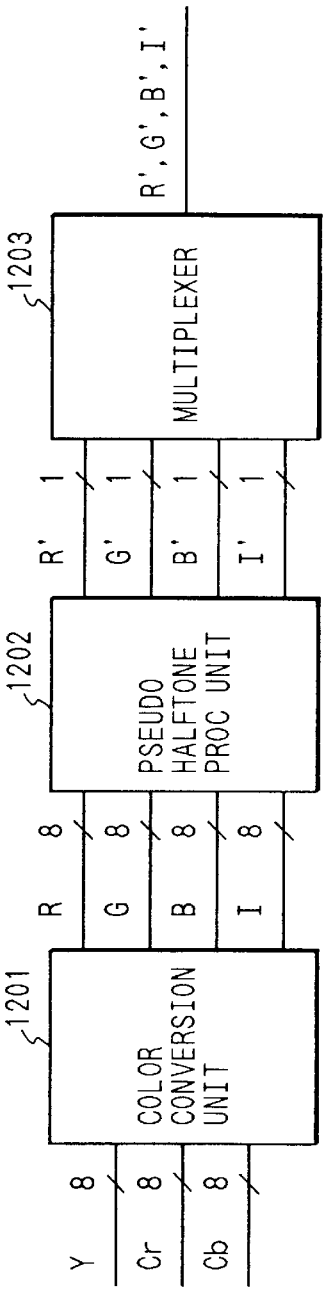

FIG. 16
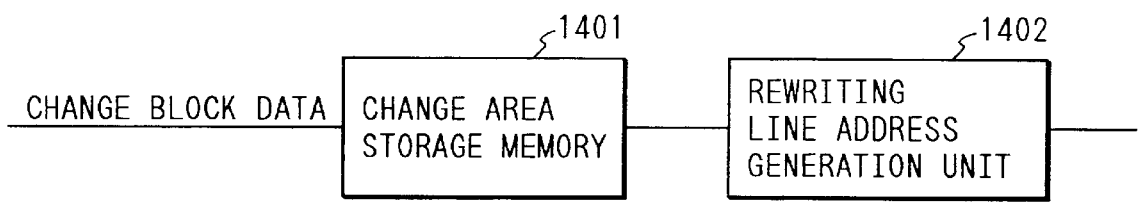
FIG. 17
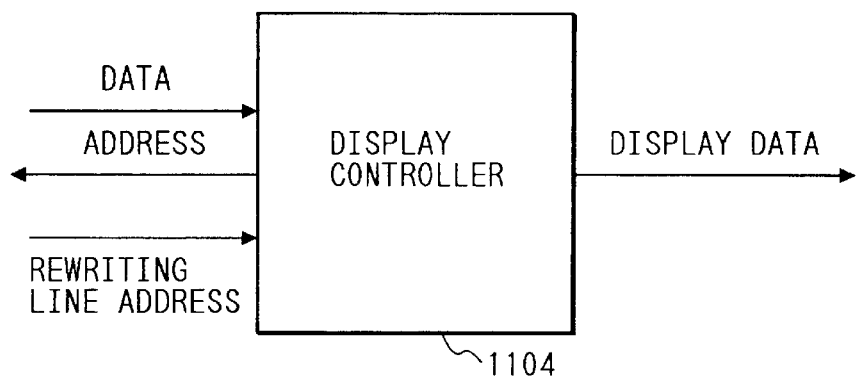
FIG. 18
| LINE ADDRESS | LINE DATA |
|---|---|
| LINE ADDRESS | LINE DATA |
| ⋮ | ⋮ |
| LINE ADDRESS | LINE DATA |

FIG. 21

| R | G | B | I | |
|---|---|---|---|---|
| 0 | 0 | 0 | 0 | BLACK |
| 0 | 0 | 0 | 1 | LIGHT GRAY |
| 0 | 0 | 1 | 0 | BLUE |
| 0 | 0 | 1 | 1 | LIGHT BLUE |
| 0 | 1 | 0 | 0 | GREEN |
| 0 | 1 | 0 | 1 | LIGHT GREEN |
| 0 | 1 | 1 | 0 | CYAN |
| 0 | 1 | 1 | 1 | LIGHT CYAN |
| 1 | 0 | 0 | 0 | RED |
| 1 | 0 | 0 | 1 | LIGHT RED |
| 1 | 0 | 1 | 0 | MAGENTA |
| 1 | 0 | 1 | 1 | LIGHT MAGENTA |
| 1 | 1 | 0 | 0 | YELLOW |
| 1 | 1 | 0 | 1 | LIGHT YELLOW |
| 1 | 1 | 1 | 0 | LIGHT GRAY |
| 1 | 1 | 1 | 1 | WHITE |

IMAGE PROCESSING APPARATUS AND METHOD FOR DISPLAYING IMAGES

BACKGROUND OF THE INVENTION

1. Field of the Invention

The invention relates to an image processing apparatus for displaying an image by a display apparatus in accordance with encoded image data.

2. Related Background Art

The use of a liquid crystal device having bistability has been proposed by Clark and Lagerwall (U.S. Pat. No. 4,367,924, etc.). A driving system of a display panel using such a liquid crystal has been proposed in, for example, U.S. Pat. No. 4,655,561.

According to such a driving system, when one scan line is selected, it is necessary to apply a pulse of one or another polarity having a peak value and a pulse width enough to certainly cause one or another orientation state of the bistable orientation states. For example, assuming that one scan line selection time is equal to 150 μsec, one vertical scan time (one frame scan time) in case of 400 scan lines is equal to 60 msec and a frame frequency is equal to 16.7 Hz. Further, the frame frequency decreases with an increase in number of scan lines.

Therefore, to display a moving image at a predetermined frame rate, it is necessary to reduce the number of lines to be scanned in one frame.

SUMMARY OF THE INVENTION

It is, therefore, an object of the invention to efficiently detect a changed portion for a previous picture plane from image data encoded by using a correlation of a plurality of picture planes, thereby enabling a partial image display in a display apparatus to be changed.

To accomplish the above object, according to the invention, there is provided an image processing apparatus comprising: detecting means for detecting a changed portion for a previous picture plane from image data encoded by using a correlation of a plurality of picture planes; and output means for outputting the image data of the portion detected by the detecting means to a display apparatus.

Another object of the invention is to prevent a deterioration of a display image in a display apparatus by executing a refreshing operation at a timing for displaying an intra-image.

To accomplish the above object, according to the invention, there is provided an image processing apparatus for controlling a display apparatus for displaying an image in accordance with image data encoded by using a correlation of a plurality of picture planes, wherein the display apparatus is allowed to execute a refreshing operation at a timing for displaying the image data which was intra-frame encoded in the above image data.

The above and other objects and features of the present invention will become apparent from the following detailed description and the appended claims with reference to the accompanying drawings.

BRIEF DESCRIPTION OF THE DRAWINGS

FIG. 12 is a block diagram showing a construction of an image processing apparatus of the first embodiment of the invention;

FIG. 13 is a block diagram showing a construction of an image processing unit 1101;

FIG. 16 is a diagram showing a construction of a partial rewriting area detection unit 1103;

FIG. 17 is a block diagram showing functions of a display controller 1104;

FIG. 18 is a diagram showing a structure of display data;

FIG. 21 is a block diagram showing a construction of filters of the display panel;

DETAILED DESCRIPTION OF THE PREFERRED EMBODIMENTS

Embodiment 1

<System>

Figure 1:
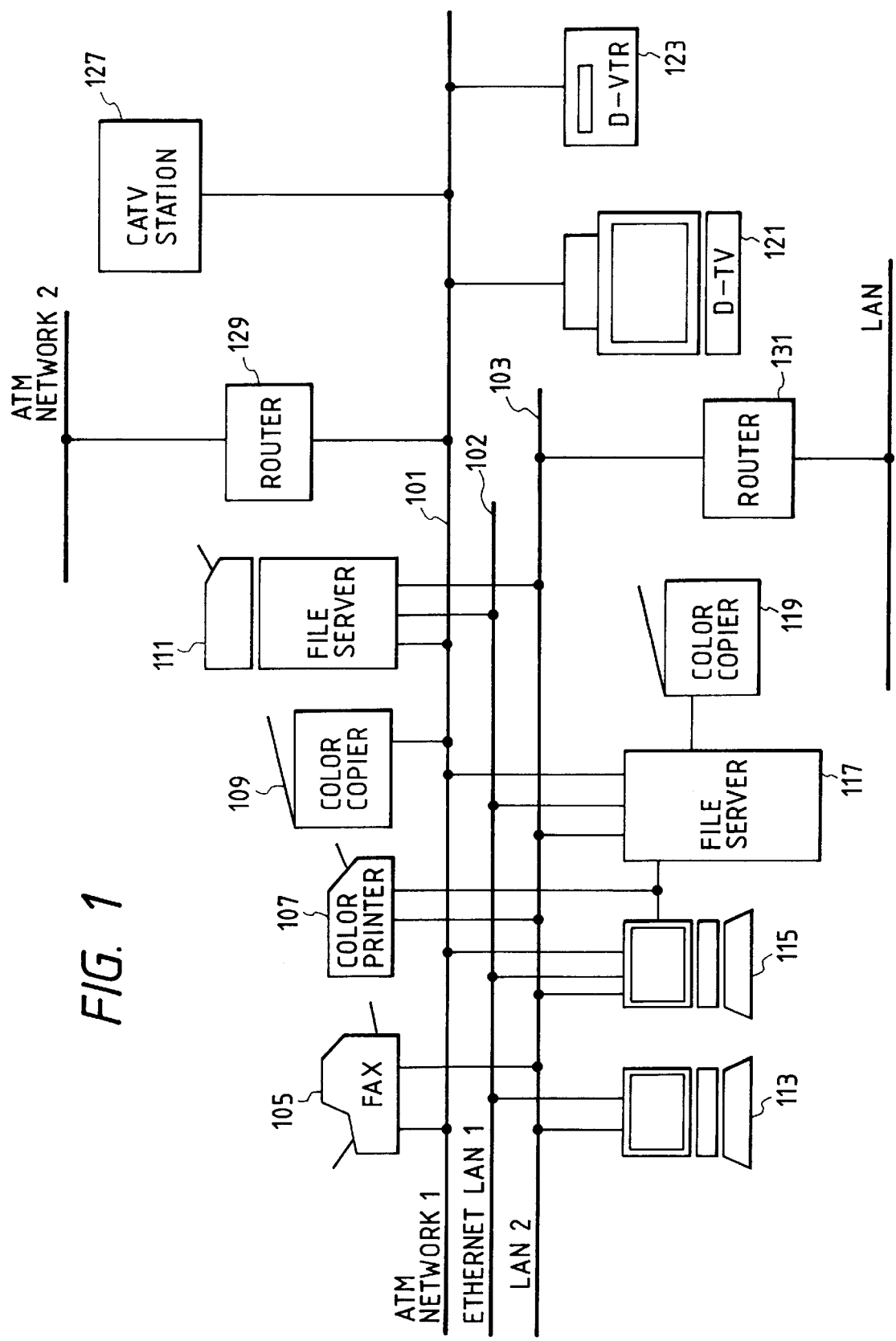
FIG. 1 is a block diagram showing a construction of a system including an image processing apparatus of the first embodiment.

FIG. 1 is a block diagram showing a construction of a system including an image processing apparatus according to the first embodiment of the invention.

In FIG. 1, reference numeral 101 denotes an ATM (asynchronous transfer mode) network for transferring various kinds of data such as image data and the like which were encoded by various kinds of systems such as JPEG, MPEG, and the like in the ATM mode; 102 and 103 local area networks (LANs) using Ethernet or the like to transfer data in a mode other than the ATM; 105 a facsimile apparatus which is connected to the ATM network and has compressing and expanding functions of image data; and 107 a color printer, having a page memory therein, for forming an image based on the image data expanded from the received compression data.

Reference numeral 109 denotes a color copying machine (color copier) including a color reader and a color printer. The color copier 109 includes: a compression circuit for compressing image data of an original read by the color reader on the basis of, for example, the JPEG system; a page memory in which the compressed image data is written; and an expansion circuit for reading out the compression image data written in the page memory and for supplying to the printer.

Reference numeral 111 denotes a file server for temporarily storing the image data that is inputted through the ATM network; 113 a workstation to input/output data to/from the file server; and 115 a personal computer (PC) which is connected to the ATM network. The personal computer 115 transmits or receives MPEG data or JPEG data to/from the foregoing local area networks, encodes or decodes the data, and also executes various processes such as editing of various image data, or the like.

The personal computer 115 is connected to the printer 107 or the like through the network line 103 or an exclusive-use line.

Reference numeral 117 denotes a server similar to the file server 111 and has a construction similar to that of the server 111.

A color copier 119 similar to the foregoing color copier 109 is connected to the server 117.

Reference numeral 121 denotes a digital television connected to the ATM network. The digital television 121 receives encoded data of the MPEG or JPEG system which is inputted through the ATM network and decodes and displays as a visible image to a CRT display apparatus.

As such a monitor, a display apparatus using a ferroelectric liquid crystal called an FLC as will be explained herein later can be also used.

Reference numeral 123 denotes a video tape recorder (VTR) for receiving the MPEG or JPEG compression image data inputted through the ATM network.

Such a VTR 123 records the MPEG or JPEG compression image data inputted from the ATM network line to a tape as compressed encode data as it is or executes a predetermined signal process to such data and records the processed image data to the tape.

The VTR 123 has an image data compressor for compressing non-compression data received from the outside on the basis of the MPEG or JPEG system and for recording the compressed data to the tape.

Reference numeral 127 denotes a CATV station for transmitting the data compressed by the MPEG or JPEG compression image data system to the ATM network.

The CATV station 127 generates broadcasting data through the ATM network line as shown in the diagram.

Reference numeral 129 denotes a router to connect another ATM network to the ATM network.

Reference numeral 131 denotes a router to connect to another local area network.

ATM network switches (not shown) are provided between the facsimile apparatus 105, printer 107, and color copier 109 and the ATM network.

<JPEG Compression Image Data>

The JPEG compression image data in various data to be transmitted by the above network will now be described.

Figure 2:
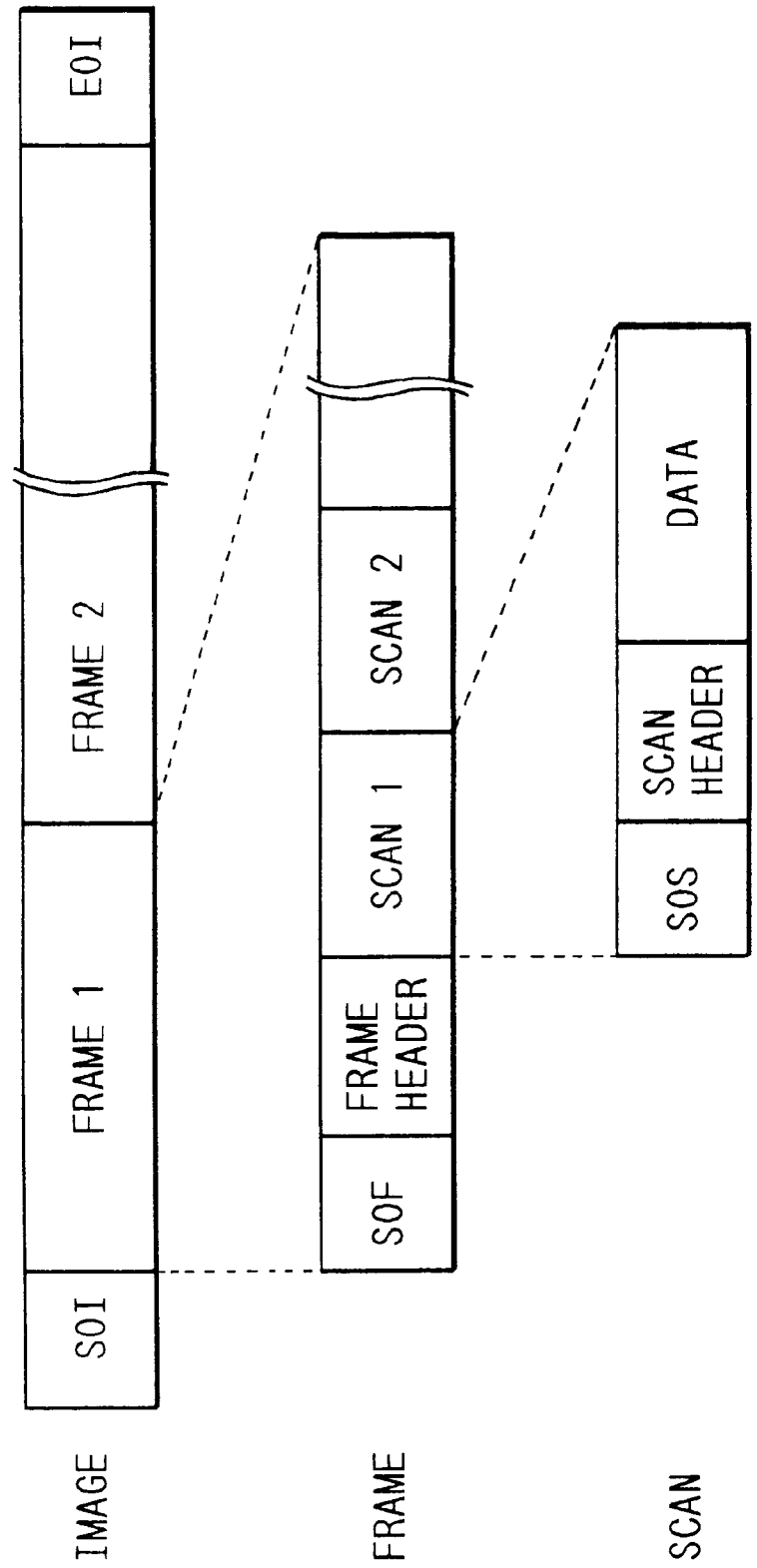
FIG. 2 is a diagram showing a data structure of JPEG.

The JPEG compression image data is the data encoded on the basis of the JPEG system of the CCITT/ISO as an international standard system which intends to compress a color still image by using frequency characteristics of data and human eyesight characteristics. In such data, encoded data and various kinds of marker codes are constructed as a hierarchy structure of image/frame/scan as shown in FIG. 2.

Namely, the JPEG data is constructed by an SOI (Start Of Image) code, a frame, and an EOI (End Of Image) code. In case of the data which was hierarchy encoded, the above frame is constructed by a plurality of frames for every hierarchy. In the case where the data is not hierarchy encoded, the above frame is constructed by a single frame.

The frame is constructed by an SOF (Start Of Frame) code, a frame header, and a scan. The scan is constructed by an SOS (Start Of Scan) code, a scan header, and encode data.

In case of independently handling luminance data (Y) and two color difference data (Cr, Cb) (namely, in case of interleaving), the above scan is constructed by a plurality of scans. In case of handling those data in a lump (namely, in case of non-interleaving), the above scan is constructed by a single scan.

Encoding and decoding algorithms in a fundamental base line system in the JPEG system as mentioned above will now be described with reference to FIGS. 3 and 4.

First, the input image data is divided into blocks of (eight pixels×eight pixels) by a block formation circuit 201. The blocks are two-dimensional DCT (discrete cosine transform) converted by a DCT circuit 202, thereby converting the data into horizontal/vertical space frequency components (DCT coefficients) comprising one kind of DC component (DC) and 63 kinds of AC components (AC).

Thus, each of the frequency components obtained by the DCT is divided and quantized by each of predetermined coefficients (quantization coefficients) by a quantizer 203. After that, the quantized frequency components are encoded by algorithms which are different for the DC component and AC component, respectively.

As quantization coefficients mentioned above, a different coefficient which is different every frequency component is generally used. The quantization coefficient for the low frequency component which is visually important is set to be smaller than the quantization coefficient for the high frequency component.

Thus, the high frequency component which is relatively unimportant is cut out and a data amount can be reduced as a whole.

As for the DC component, by using the fact that the correlation with adjacent blocks is high, the difference between the DC component of a relevant block and the preceding block is obtained by a differential circuit 204. A differential value obtained is one-dimensional Huffman encoded by a Huffman encoder 205, thereby obtaining encoded data of the DC component.

On the other hand, with respect to the AC components, the above 63 kinds of AC components are sequentially scanned in a zigzag manner from the frequency component on the low frequency side which is visually important by a scan circuit 206 and are converted to a one-dimensional array. A judgment circuit 207 discriminates whether a value of each component is equal to "0 value" or values (valid coefficients) other than the 0 value.

With respect to the "0 value", a 0 run is counted by a counter 208. The valid coefficients are grouped by a grouping circuit 209 on the basis of their values. A two-dimensional Huffman encoding is executed by a Huffman encoder 210 by a combination between the run lengths and group values obtained, thereby obtaining encoded data of the AC components.

The above Huffman code reduces the data amount as a whole by allocating a shorter code length to a value having a high occurrence probability (the differential value with respect to the DC component or the combination of the run lengths and valid coefficients with respect to the AC components).

With respect to the value of a low occurrence probability, by combining with a predetermined code (ZRL code), all of the patterns can be expressed by a limited number of codes.

By executing the above processes on a block unit basis, the encoding of one color still image is completed.

Figure 3:
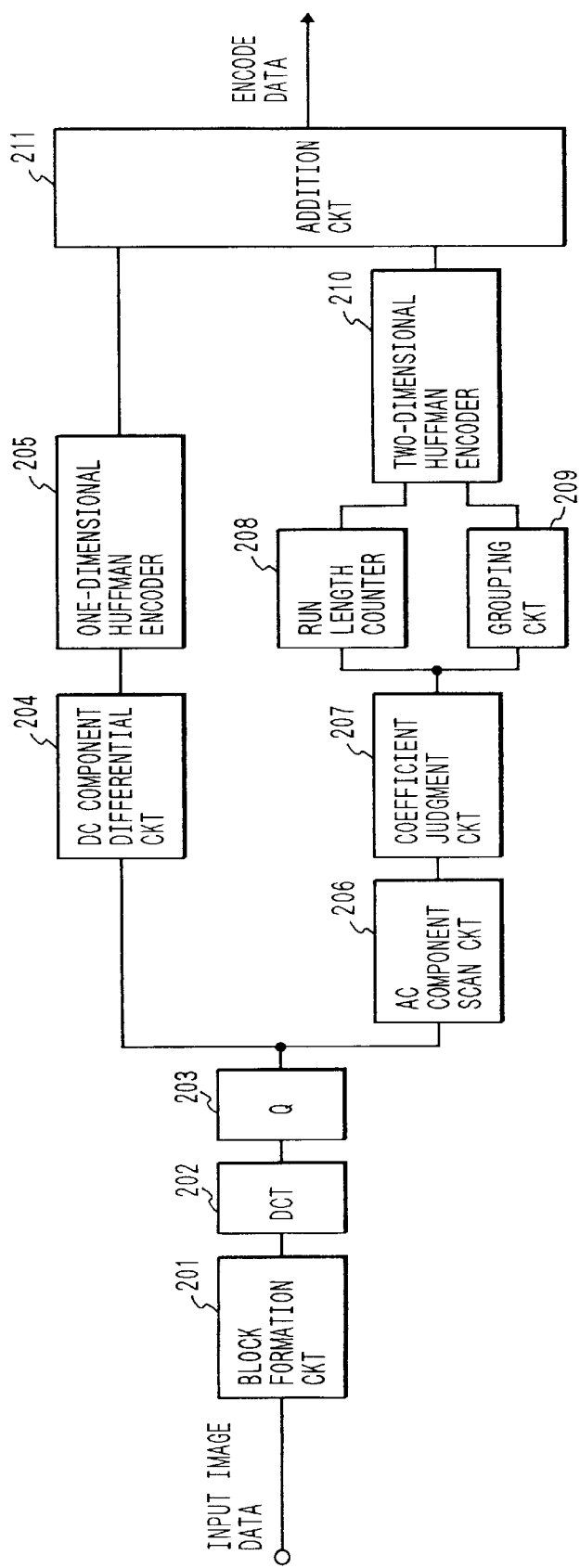
FIG. 3 is a diagram showing a construction of an encoding apparatus in a JPEG system.
Figure 4:
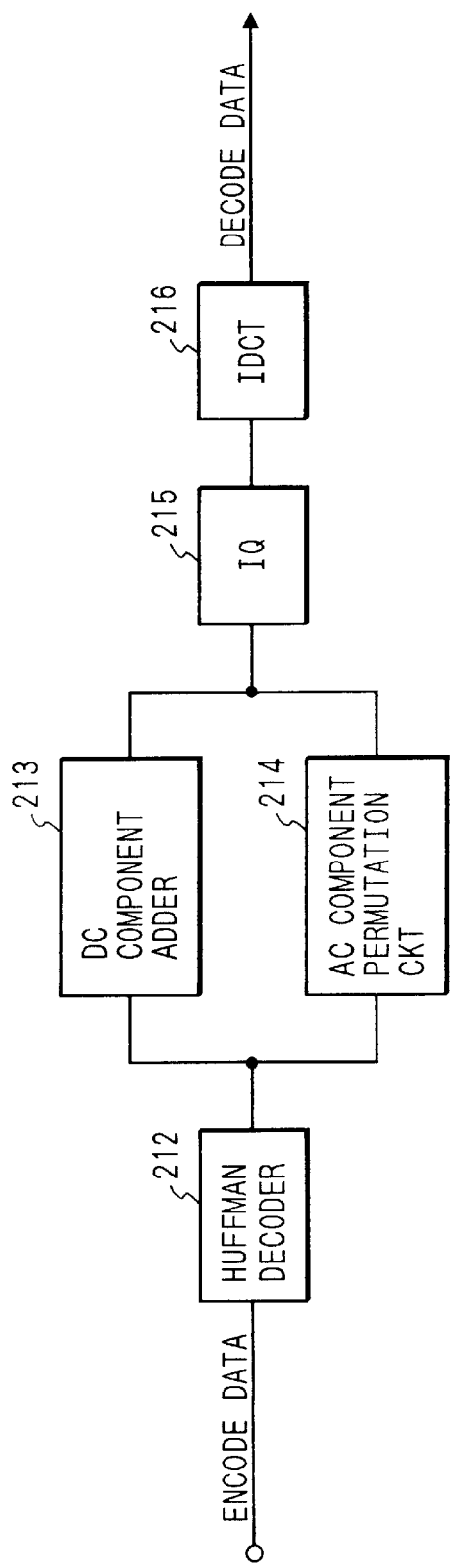
FIG. 4 is a diagram showing a construction of a decoding apparatus in the JPEG system.

After that, each of the encoded data is added with the foregoing marker code or the like by an addition circuit 211 and becomes JPEG compression image data shown in FIG. 3.

Since the above quantization coefficients and Huffman code can be arbitrarily set, data indicative of the quantization coefficients and Huffman code used for encoding is added after the SOI code.

The decoding algorithm will now be described.

The decoding algorithm is fundamentally opposite to the encoding algorithm. The inputted encoded data is decoded by a decoder 212 by using a Huffman table sent together with the encoded data. In the decoded data, the DC component is added to the DC component of the previous block by an adder 213, thereby obtaining the original DC component. With respect to the AC components, each of the decoded frequency components is converted to the original two-dimensional array by a permutation circuit 214.

After that, those frequency components are inversely quantized by an inverse quantizer 215 and is inverse DCT converted by an inverse DCT circuit 216 after that, thereby converting into the original image data (decoded data).

By executing the above processes on a block unit basis and the decoding of one color still image is finished.

Although the above algorithm is a fundamental algorithm of the JPEG system, a system in which various kinds of hierarchy encoding processes are further added to it is recognized as a JPEG system. In case of executing the hierarchy encoding, the kind of hierarchy encoding is shown by the SOF code.

<MPEG Compression Image Data>

The MPEG compression image data in various data to be transmitted by the above network will now be described.

The MPEG compression image data is based on the international standard which intends to perform a high efficient encoding of a moving image. Although the frequency characteristics of the data and the human eyesight characteristics are fundamentally used in a manner similar to the foregoing JPEG system, the MPEG compression image data is based on a system for performing a further high efficient encoding by using a redundancy in the time base direction that is peculiar to the moving image.

The MPEG system includes: MPEG1 in which a transfer rate is set to up to 1.5 Mbps for digital storage media; and MPEG2 which intends to be used for all of transmission systems such as bidirectional digital multimedia equipment, digital VTR, ATV, optical fiber network, etc. by eliminating an upper limit of the transmission rate. However, since their fundamental algorithms are almost similar, a data structure of MPEG1 and its encoding and decoding algorithms will now be described with respect to MPEG1 as a base.

In MPEG2, although an encoding method which can be used is specified by a plurality of profiles (simple profile, main profile, scalable, space scalable, high), the typical main profile is fundamentally similar to MPEG1.

First, a principle of such a high efficient encoding system by the MPEG system will now be described.

In the high efficient encoding system, by obtaining a difference between frames, a redundancy in the time base direction is dropped, differential data obtained by such a drop is DCT converted and variable length encoded, and a redundancy in the space direction is dropped, thereby realizing a high efficient encoding as a whole.

With respect to the redundancy in the time base direction, by paying an attention to a fact that in case of a moving image, a correlation among continuous frames is high, a difference between the frame to be encoded and the preceding or subsequent frame with regard to time is obtained, so that redundancy can be eliminated.

Figure 5:
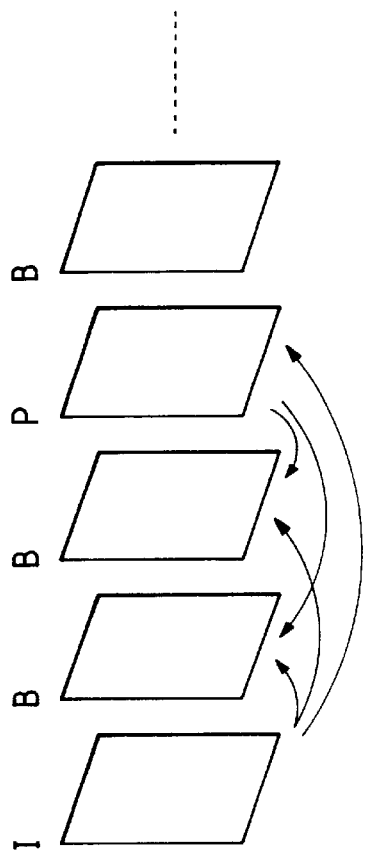
FIG. 5 is a diagram for explaining an encoding principle in the JPEG system.

In MPEG, accordingly, in addition to an intra-encoded image which is encoded mainly in the frame as shown in FIG. 5, there are provided: a forward prediction encoding image (P-picture) in which a differential value between the target frame and the frame that is precedent with respect to the time is encoded; and a bidirectional prediction encoding image (B-picture) in which between a differential value between the target frame and the frame that is preceding or subsequent with regard to the time and a differential value between the target frame and the interpolation frame derived from both of those frames, the differential value of the smallest data amount is encoded. The frames in those encoding modes are combined in accordance with a predetermined order.

In the case where a new object appears in the image, there is a case where by obtaining a difference with the subsequent image rather than obtaining a difference with the image that is precedent with respect to the time, its differential value is reduced.

In MPEG, therefore, the bidirectional prediction encoding as mentioned above is executed, thereby performing a higher efficient compression.

In MPEG, a movement (or motion) compensation is executed to obtain each prediction image.

That is, a macro block is formed by collecting four (=2×2) blocks of (8 pixels×8 pixels) mentioned above with respect to the luminance data and two such blocks with regard to the color difference data. A difference between the corresponding block of the corresponding image and the macro block near such a block is obtained on a macro block unit basis. By detecting the macro block in which such a difference is smallest, a movement vector is detected. This movement vector is encoded as data.

When performing the movement compensation and prediction encoding as mentioned above, after the image that is precedent with respect to the time was once encoded, the image which is again decoded is obtained and is set to a precedent image.

The prediction encode data and movement vector as mentioned above are subjected to the DCT and Huffman encoding as described above, so that it is high efficient encoded.

A data structure of the MPEG system will now be described.

Figure 6:
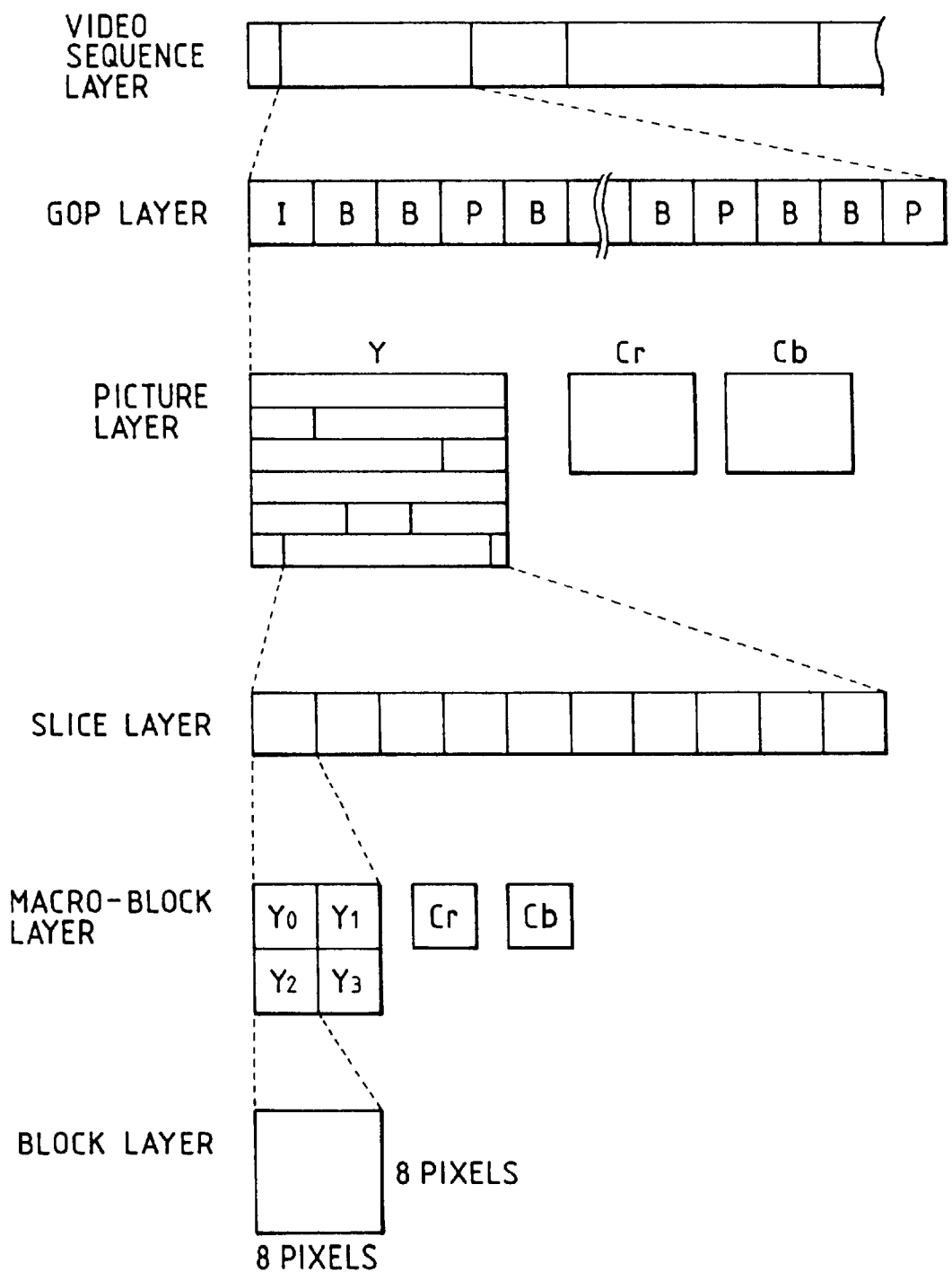
FIG. 6 is a diagram showing a data structure of an MPEG.

As shown in FIG. 6, the data structure is constructed by a hierarchy structure comprising a video sequence layer, a GOP layer, a picture layer, a slice layer, a macro block layer, and a block layer.

Each layer will now be described from the lower layer in the diagram in accordance with the order hereinbelow.

First, the block layer is constructed by (8 pixels×8 pixels) every luminance data and color difference data in a manner similar to the foregoing JPEG and the DCT is executed on such a unit basis.

In the macro block layer, four blocks of (8 pixels×8 pixels) mentioned above with respect to the luminance data and one such block with regard to the color difference data are combined and a macro block is added to them. According to the MPEG system, such a macro block is used as a unit for prediction encoding and movement vector detection, which will be explained hereinlater.

The macro block header includes: each data about the movement compensation and quantization steps of each macro block unit; and data indicating whether six DCT blocks (Y0, Y1, Y2, Y3, Cr, Cb) in each macro block has data or not.

The slice layer is constructed by one or a plurality of macro blocks which are continuous in accordance with the scanning order of an image and a slice header. The quantization steps in a series of macro blocks in the same slice layer are set to be constant. The slice header has data regarding the position of the slice and the quantization steps and can be recovered by using the slice as a unit even if an error occurs during the decoding.

The head macro block resets the differential value of the DC components.

The picture layer is formed by collecting a plurality of slice layers mentioned above on a frame unit basis and is constructed by: a header comprising a picture start code or the like; and one or a plurality of slice layers subsequent to the header.

The header includes a code indicative of the encoding mode of the image and a code indicative of a movement detection precision (whether the detection is performed on a pixel unit basis or a half pixel unit basis).

The GOP layer is constructed by: a header such as group start code, time code indicative of the time from the beginning of a sequence, or the like; and a plurality of I frames, B frames, or P frames subsequent to the header.

The video sequence layer starts from a sequence start code and ends at a sequence end code. Control data such as image size data or the like and a plurality of GOPs each having the same image size and the like are arranged between the sequence start code and the sequence end code.

In the MPEG system having such a data structure, a bit stream of each layer is specified by its standard.

The fundamental encoding apparatus and decoding apparatus for handling the MPEG data as mentioned above will now be described with reference to FIGS. 7 and 8.

Figure 7:
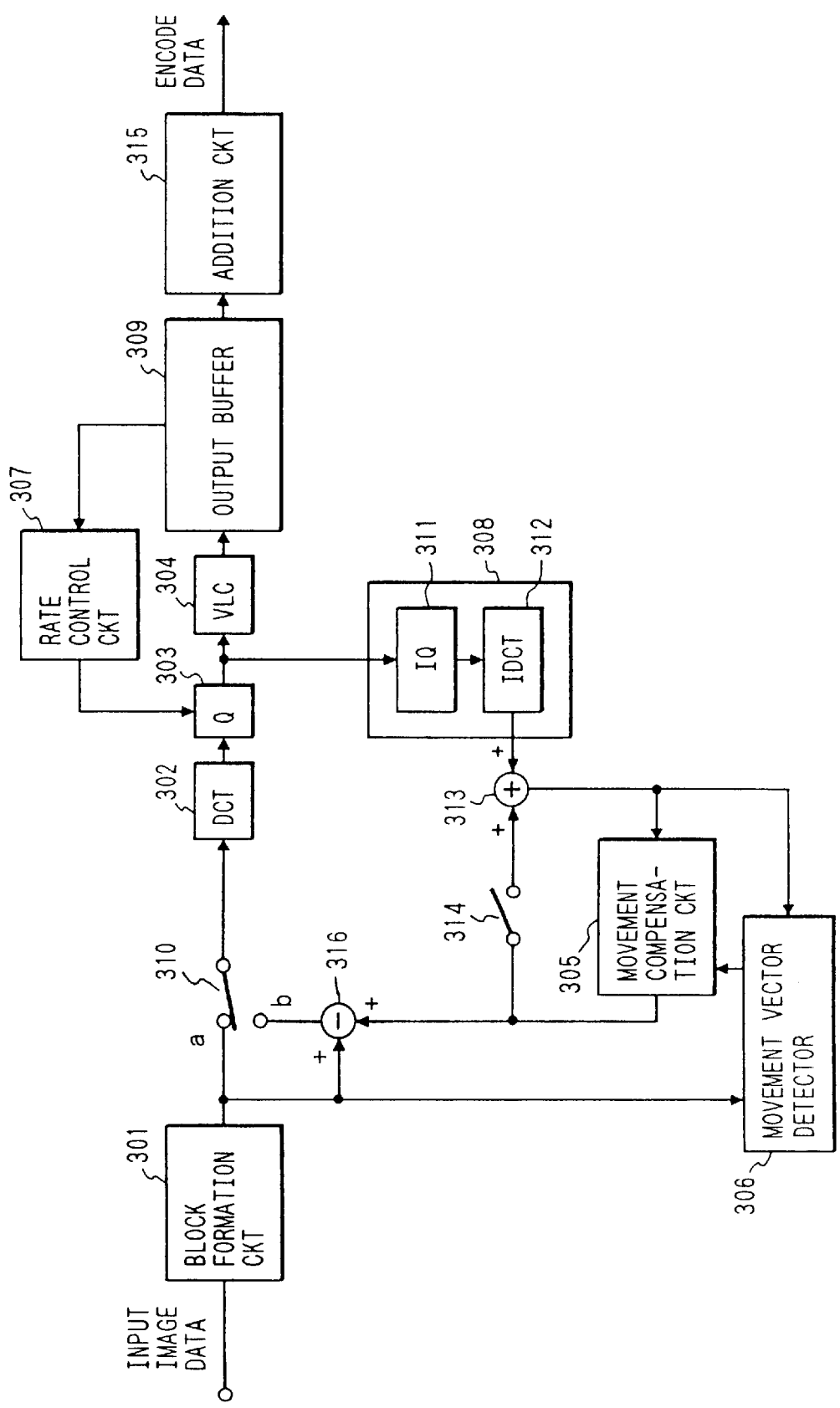
FIG. 7 is a diagram showing a construction of an encoding apparatus in an MPEG system.

As shown in FIG. 7, the encoding apparatus is schematically constructed by a block formation circuit 301, a DCT circuit 302, a quantizer 303, a variable length encoder (VLC) 304, a movement compensation circuit 305, a movement vector detector 306, a rate control circuit 307, a local decoder 308, an output buffer 309, and the like.

Figure 9:
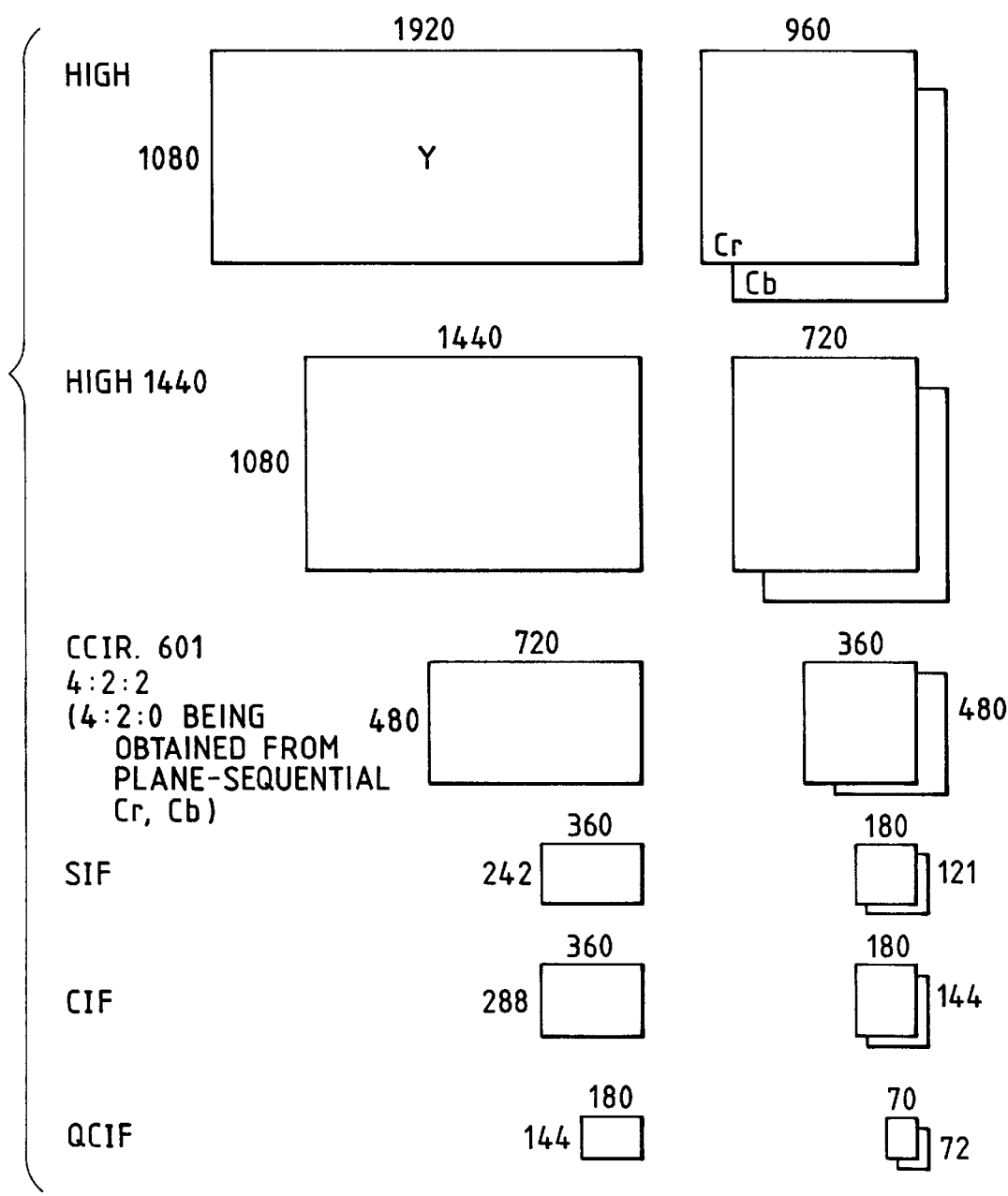
FIG. 9 is a diagram showing an image size as a target to be encoded in the MPEG system.

As image sizes as targets to be encoded in the encoding apparatus, as shown in FIG. 9, there are sizes corresponding to (4:2:2), (4:2:0), SIF, CIF, and QCIF formats. In MPEG1, the image size of the SIF format is used as a target.

In the encoding apparatus, the image data to be encoded is set to the blocks of (8 pixels×8 pixels) mentioned above in the block formation circuit 301 and is transferred to the DCT circuit 302 through a switch 310.

The switch 310 is switched in accordance with whether the input image data is an intra-frame image or an inter-frame image. In case of the intra-frame image, the switch 310 is connected to a contact (a). In case of the inter-frame image, the switch is connected to a contact (b).

In case of the intra-frame image, the input image data is DCT converted by the DCT circuit 302. DCT coefficients obtained by the DCT are quantized by the quantizer 303 and are, further, encoded by the variable length encoder 304. After that, the encoded image is once stored in the buffer 309.

In case of the inter-frame image, the switch 310 is connected to the contact (b), so that the prediction encoding with the movement compensation described above is executed.

Namely, reference numerals 311 and 312 denote an inverse quantizer and an inverse DCT circuit constructing the local decoder 308. The data quantized by the quantizer 303 is returned to the original data by the local decoder 308.

Reference numeral 313 denotes an adder; 314 a switch which is closed only in case of the inter-frame image; and 316 a subtracter. As for the image data which was local decoded as mentioned above, the corresponding macro block in a predetermined image (precedent image, subsequent image, or interpolation image of them) is outputted with reference to a movement vector detected by the movement vector detection circuit 306.

An output of the movement compensation circuit 305 is subtracted from the input image data by the subtracter 316, so that a prediction value with a movement compensation is obtained. The prediction value is encoded by the DCT circuit 302, quantization circuit 303, and variable length encoder 304 mentioned above and is stored into the buffer 309.

The movement vector detector 306 compares the image data to be encoded and predetermined reference image data, thereby obtaining a movement vector. An output of the detector 306 is supplied to the movement compensation circuit 305 and designates a macro block to be outputted by the movement compensation circuit 305.

The rate control circuit 307 controls a code amount by switching the quantization steps in the quantizer 303 on the basis of an occupation amount of the encoded data in the buffer.

Finally, various headers as mentioned above are added to the encoded data by an addition circuit 315 and the resultant data is transmitted as MPEG compression image data corresponding to the MPEG system.

Figure 8:
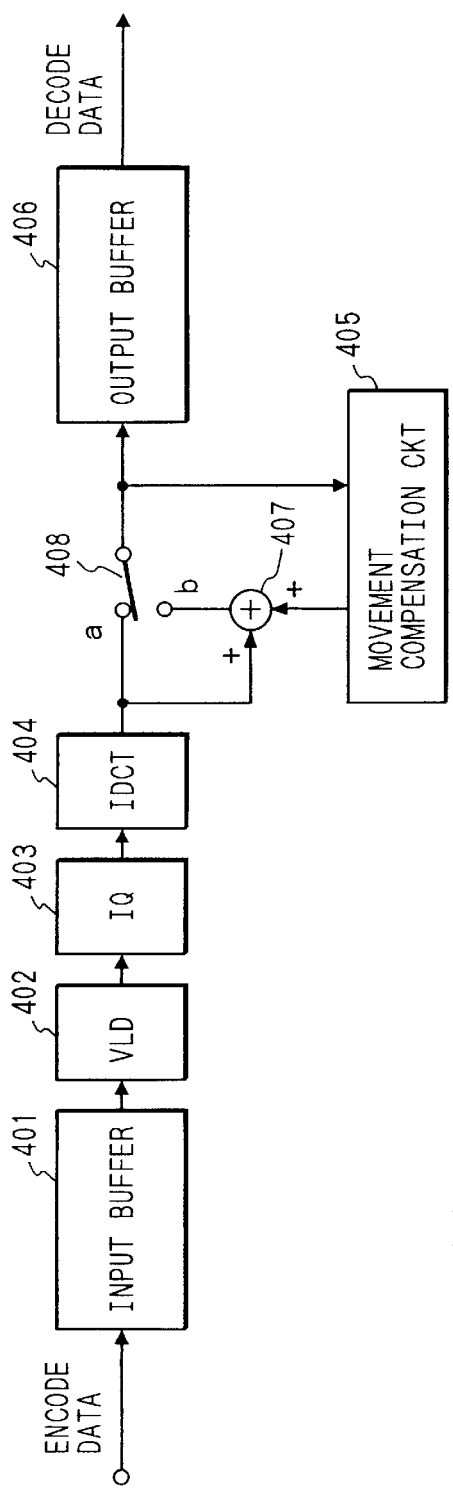
FIG. 8 is a diagram showing a construction of a decoding apparatus in the MPEG system.

On the other hand, the decoding apparatus fundamentally executes an operation opposite to the encoding operation and is constructed by an input buffer 401, a variable length decoder (VLD) 402, an inverse quantizer 403, an inverse DCT circuit 404, a movement compensation circuit 405, an output buffer 406, and the like as shown in FIG. 8.

Namely, the encoded data which is sequentially read out from the input buffer 401, is processed by the variable length decoder 402, inverse quantizer 403, and inverse DCT circuit 404 and is converted to the data in a space area.

Reference numeral 407 denotes an adder to add a prediction value from the movement compensation circuit 405 to an output of the inverse DCT circuit 404. Reference numeral 408 indicates a switch to select the output of the inverse DCT circuit 404 or an output of the adder 407.

The switch 408 is connected to a contact (a) in case of the intra-frame image or to a contact (b) in case of the inter-frame image on the basis of an encoding ID code detected by a data detection circuit (not shown).

The decoded data which was decoded as mentioned above is once stored in the output buffer 406 and is, further, reconstructed to the original space arrangement and is outputted as image data of one frame.

<ATM Format>

An ATM communication format will now be described.

Figure 10:
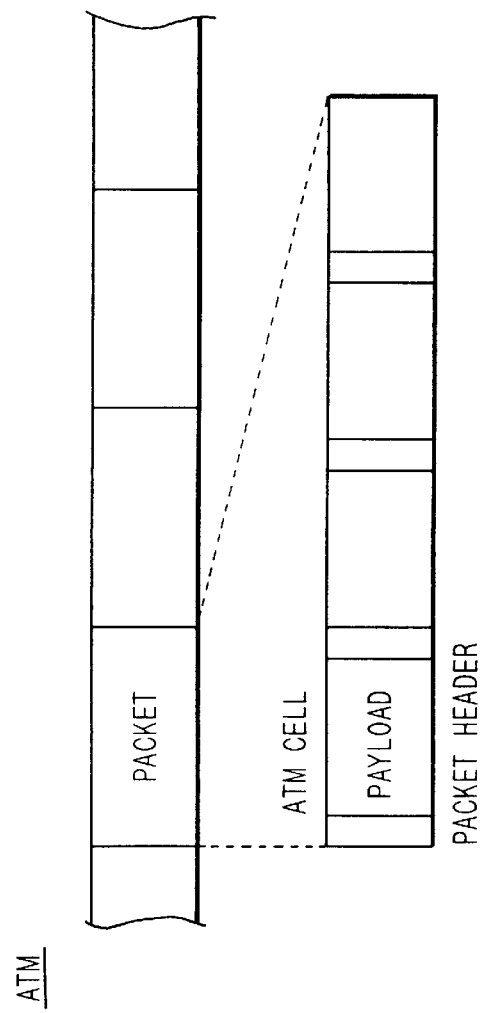
FIG. 10 is a diagram for explaining an ATM communication format.

In the ATM communication, as shown in FIG. 10, a bit stream series is divided into a plurality of fixed length packets. Each packet is constructed by a plurality of (for example, four) ATM cells.

Each ATM cell is constructed by a packet header and a payload for data. Generally, the header consists of five bytes and the data consists of 48 bytes.

The ATM communication can transmit data independent of (asynchronously with) the bit rate of the network and can arbitrarily set a transmission rate by the number of transmission cells per unit time, so that the ATM communication is suitable for a transmission system for mixedly transmitting various data.

\<Personal Computer\>

A construction of the personal computer in FIG. 1 will now be described.

Figure 11:
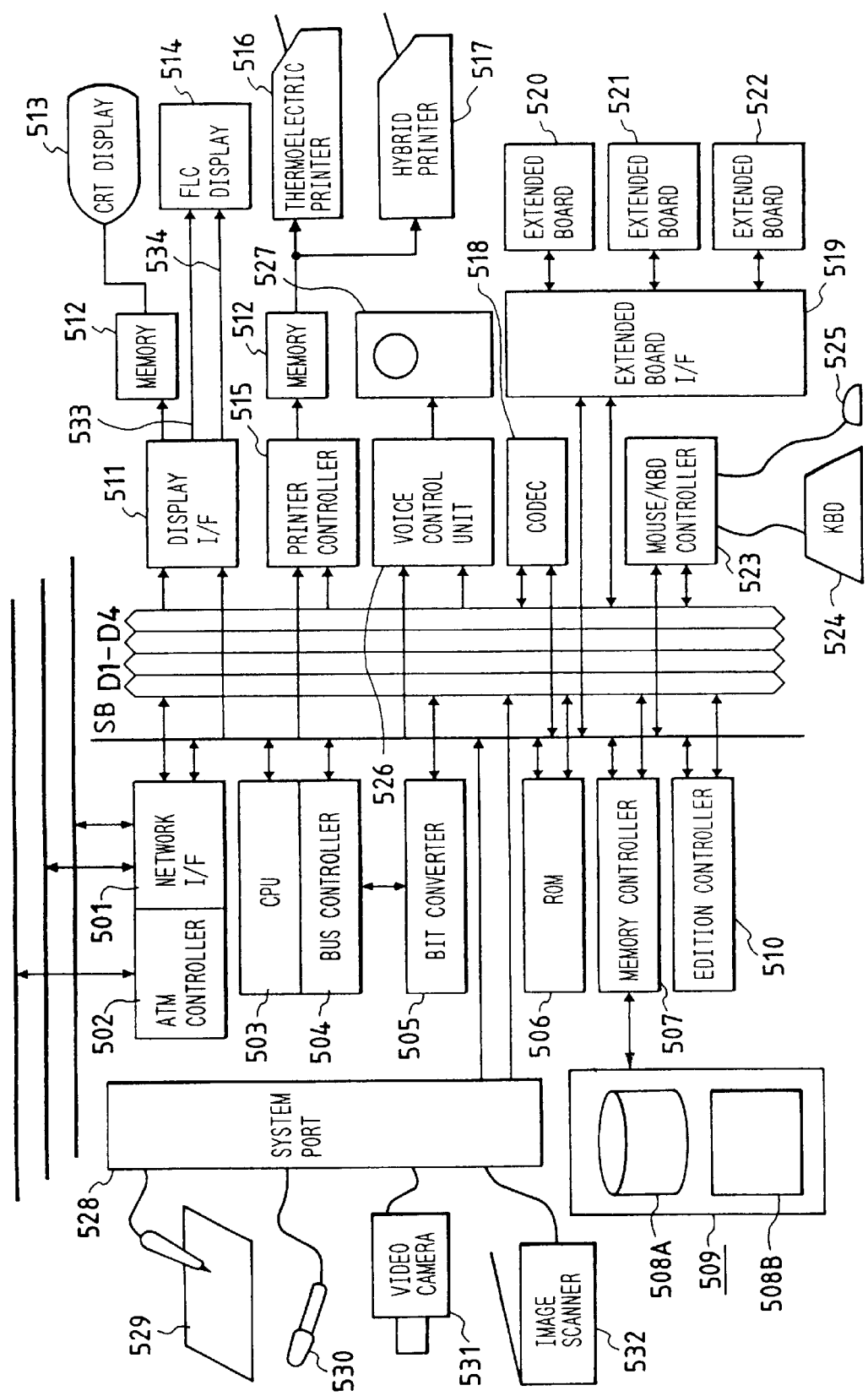
FIG. 11 is a block diagram showing a construction of a personal computer according to the first embodiment of the invention.

FIG. 11 shows a construction of the personal computer in the embodiment. The personal computer has a multibus system which selectively uses the optimum data bus in accordance with the data amount of data to be transmitted and the transfer speed that is required for processes in order to handle data corresponding to various systems as mentioned above and to have various functions. In the embodiment, the personal computer has a 16-bit data bus D1, a 32-bit data bus D2, a 64-bit data bus D3, and a 128-bit data bus D4 as an extended bus.

The personal computer has an extended board interface, which will be explained hereinlater, for enabling the functions to be extended. The functions can be extended by various kinds of extended board which are connected to such an interface.

Explanation will now be made in detail hereinbelow.

Reference numeral 501 denotes a network interface. Various data is transmitted or received to/from each of the above transmission channels through the network interface 501 and an ATM controller 502 in the interface 501.

In the diagram, reference numeral 503 denotes a CPU for controlling the whole apparatus. The CPU 503 has a bus controller 504 and a bit converter 505 constructing the above multibus system as a sub CPU.

Reference numeral 506 denotes a ROM and 507 indicates a memory controller. By the memory controller 507, data is transmitted or received to/from an external memory device 509 having a hard disk device 508A, a CD-ROM 508B, and the like.

Reference numeral 510 denotes an edition controller. A phase management or the like of data at the time of the image edition or the like is executed by the edition controller 510.

Reference numeral 511 denotes a display interface. The image data which is sent from the display interface 511 is displayed on a CRT display 513 through a memory 512.

The display interface 511 properly executes a process in accordance with the kind of display device. Specifically speaking, in case of outputting the MPEG compression image data decoded by a codec 518 to the FLC display 514, Y, Cr, and Cb (each consisting of eight bits) data 533 and change block data 534 are outputted to an FLC display 514. When decoding in the codec 518, the change block data 534 is formed by a reference, which will be explained hereinlater, and is transmitted to the display interface 511 together with the decoded image data.

Reference numeral 515 denotes a printer controller. The printer controller 515 selectively uses either one of a thermoelectric printer 516 and a hybrid printer 517 having a plurality of different printer units such as BJ system, thermoelectric system, and the like in accordance with image data to be printed.

The memory 512 can be also commonly used for the display and printer.

Reference numeral 518 denotes the codec for encoding or decoding data. In the embodiment, a codec corresponding to the JPEG system and MPEG system as described above is provided.

Reference numeral 519 denotes an extended board interface. The functions of the personal computer can be extended by connecting various extended boards 520, 521, and 522 through the interface 519.

Reference numeral 523 denotes a mouse/keyboard controller. A keyboard 524 and a mouse 525 are connected through the controller 523.

Reference numeral 526 denotes a voice control unit and 527 indicates a voice speaker.

A hand-writing input device 529, a voice microphone 530, a video camera 531, and an image scanner 532 are connected to the personal computer through a system port 528.

Since the personal computer with such a construction has a multibus system comprising the multidata buses D1, D2, D3, and D4, bus controller 504, and bit converter 505, the optimum data bus is selectively used in accordance with the data amount, the transfer and processing speeds which are required for processes, and the like.

The functions can be extended by the extended boards which are connected to the extended board interface 519.

\<Image Display Unit\>

FIG. 12 is a block diagram showing a construction of an image processing apparatus of the embodiment of the invention.

In FIG. 12, reference numeral 1101 denotes an image processing unit for executing predetermined image processes to the image data of a color space of Y, Cr, and Cb every pixel which was decoded by the codec 518 in FIG. 11 and outputs the processed image data. Reference numeral 1102 denotes an image memory unit to store the image data processed by the image processing unit 1101; 1103 a partial rewriting area detection unit to detect an area to be preferentially rewritten in one frame from the data from the decoding unit; and 1104 a display controller. In the image data stored in the image memory unit 1102, the image data in the area which was decided as an area to be rewritten by the partial rewriting area detection unit 1103 is outputted by the display controller 1104 together with information indicative of such a rewriting area. Reference numeral 1105 denotes a display panel using a ferroelectric liquid crystal, which will be explained hereinlater. The display panel 1105 displays the image in accordance with the data from the display controller.

FIG. 13 is a block diagram showing a construction of the image processing unit 1101.

In FIG. 13, reference numeral 1201 denotes a color conversion unit for converting the luminance data Y and chrominance data Cr and Cb each consisting of eight bits from the codec 518 into data of R (red), G (green), B (blue), and I (white) each consisting of eight bits; 1202 denotes a pseudo halftone processing unit for respectively independently binarizing the color component data of R, G, B, and I and for generating color component data of R', G', B', and I' each consisting of one bit; and 1203 a multiplexer for rearranging the color component data of R', G', B', and I' to a data train according to the display of the display panel.

Figures 14, 15:
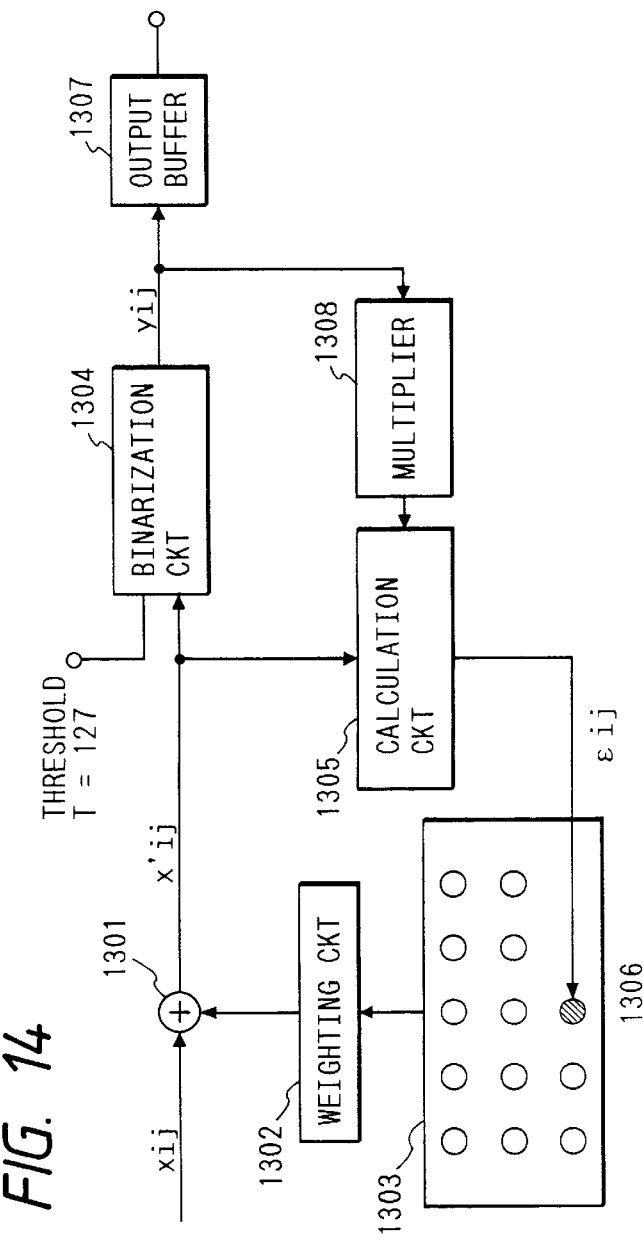
FIG. 14 is a diagram showing a circuit construction of a JP pseudo halftone processing unit 1202.
FIG. 15 is a diagram showing an example of weight coefficients in an error diffusion method.

FIG. 14 is a block diagram showing a construction of a halftone processing circuit of the pseudo halftone processing unit 1202. A method which will be explained here is called an average error least method similar to the error diffusion method. As such a halftone processing circuit, four halftone processing circuits each having a similar construction are provided for the color components of R', G', B', and I'.

Multivalue data $x_{ij}$ is added by an adder 1301 to a value which is obtained by multiplying a weight coefficient $\alpha_{ij}$ designated by a weighting circuit 1302 to an error $\epsilon_{ij}$ (difference between correction data $x'_{ij}$ which occurred before and output data $y_{ij}$) preserved in an error buffer memory 1303.

The above process is shown by the following expression.

$$x'_{ij} = x_{ij} + \left(\sum_{kl} \alpha_{kl}\varepsilon_{i+k,j+l}\right) / \sum_{kl} \alpha_{kl}$$

FIG. 15 shows an example of the weight coefficients. In FIG. 15, * denotes a position of a pixel which is at present being processed.

The correction data $x'_{ij}$ is compared with a threshold value (it is now assumed that $D_{max}=255$ and $T=127$) by a binarization circuit 1304, so that the data $Y_{ij}$ is outputted. The data $y_{ij}$ is the binarized data and is stored in an output buffer 1307 and is outputted as binary data.

A calculation circuit 1305 calculates the difference $\varepsilon_{ij}$ between the correction data $x'_{ij}$ and the value obtained by multiplying the output data $y_{ij}$ by 255 times by a multiplier 1308. The result of the calculation is stored at the position corresponding to a pixel position 1306 in the error buffer memory 1303. By repeating the above processes, the binarization by the average error least method is executed.

FIG. 16 is a block diagram showing a construction of the partial rewriting area detection unit 1103.

In FIG. 16, reference numeral 1401 denotes a change area storage memory for storing area information in which a change occurred for the previous frame on the basis of change block data from the codec 518.

Specifically speaking, the codec 518 forms the change block data as follows.

(In the case where the block as a target to be processed is the inter-frame image)

Among the decoded blocks, the blocks other than the blocks which satisfy the following two conditions are set to change blocks and change block data indicative of the positions of the change blocks is stored into the change area storage memory 1401.

(1) A difference between the target block and the corresponding block of the previous frame is equal to zero.

(2) The movement vector is equal to zero.

Reference numeral 1402 denotes a rewriting line address generation unit for generating address data of a line including at least the change blocks of one block in the scanning direction by using such a line as a line to be rewritten.

(In the case where the block as a target to be processed is the intra-frame image)

In this case, the 4n-th line (n is an integer) is rewritten at the first intra-frame, the (4n+1)th line is rewritten at the next intra-frame, the (4n+2)th line is rewritten at the next intra-frame, and the (4n+3)th line is rewritten at the next intra-frame. As mentioned above, since the picture plane is forcedly refreshed at the intra-frame in the embodiment, even with respect to the portion which is not partially rewritten in the inter-frame, the display image is renewed at a predetermined period and the image of a high picture quality can be displayed.

FIG. 17 is a block diagram showing functions of the display controller 1104.

On the basis of the rewriting line address data from the rewriting line address generation unit 1402, the display controller 1104 reads out the image data corresponding to the address in the image data stored in the image memory unit 1102 and generates as display data together with the rewriting line address data.

FIG. 18 is a diagram showing a construction of the display data. In all of the display data, the line address data and the line data of its address form a pair.

Figure 19:
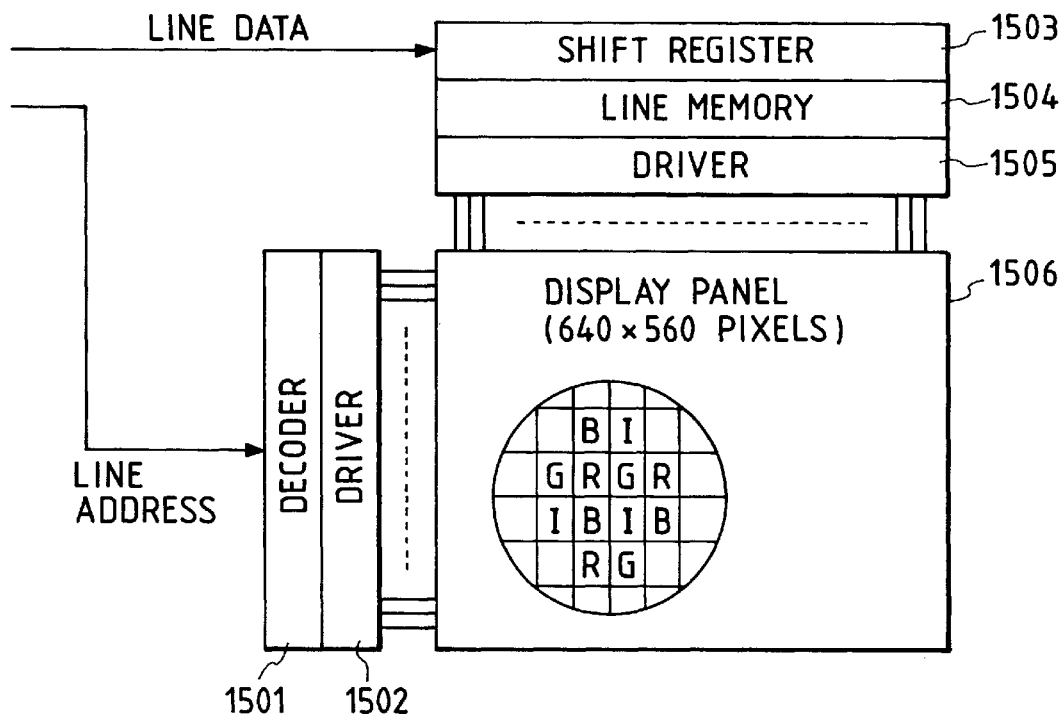
FIG. 19 is a block diagram showing a construction of a display panel.

FIG. 19 is a block diagram showing a construction of the display panel.

In FIG. 19, reference numeral 1501 denotes a decoder for supplying a control signal to a driver 1502 so as to rewrite the image of the corresponding line in accordance with the line address data. The driver 1502 dynamically controls liquid crystal cells of a display panel 1506 on a line unit basis in accordance with the control signal. Reference numeral 1503 denotes a shift register for supplying the binary data of every line to a line memory in parallel; 1504 denotes a line memory for supplying the binary data indicative of ON/OFF of each of the liquid crystal cells of one line to a driver 1505; and 1505 the driver to control each of the liquid crystal cells of the display panel 1506 in accordance with the binary data from the line memory 1504.

Figure 20:
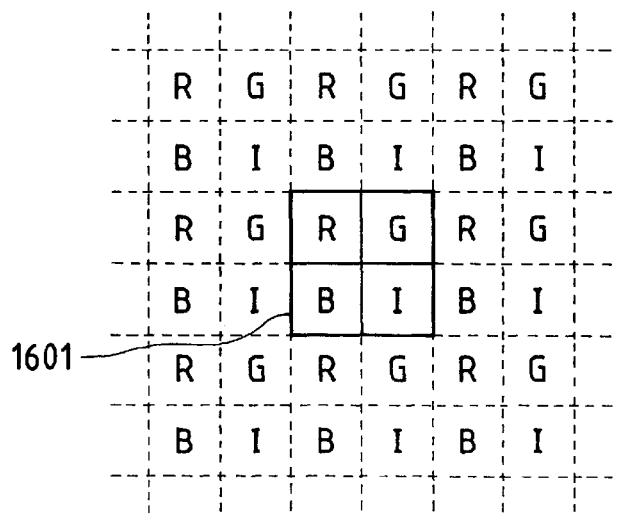
FIG. 20 is a diagram showing an arrangement of elements of the display panel.

FIG. 20 is a diagram showing an arrangement of the devices of the display panel 1506.

In FIG. 20, R, G, B, and I shown in a region 1601 form a fundamental unit constructing one pixel and comprise four liquid crystal cells which can independently control the transmission and shut-off of a white light which is exposed from the backward. Color filters of four colors of R, G, B, and I are arranged for those four liquid crystal cells. Therefore, the fundamental unit can display sixteen colors shown in FIG. 21 by the independent control of four liquid crystal cells.

As a liquid crystal material which is used for the display panel of the embodiment, a chiral smectic liquid crystal is most suitable and has a ferroelectricity. Specifically speaking, it is possible to use liquid crystals of a chiral smectic C phase (SmC*), a chiral smectic G phase (SmG*), a chiral smectic F phase (SmF*), a chiral smectic I phase (SmI*), and a chiral smectic H phase (SmH*). As specific examples of ferroelectric liquid crystal compounds, there can be mentioned desiloxy benzylidene-p'-amino-2-methyl butyl cinnamate (DOBAMBC), hexyloxy benzylidene-p'-amino-2-chloropropyl cinnamate (HOBACPC), 4-o-(2-methyl)-butyl resorcylidene-4'-octylaniline (MBRA8). As a particularly preferable ferroelectric liquid crystal, a liquid crystal which exhibits a cholesteric phase on a temperature side higher than them can be used. For example, a biphenyl ester system liquid crystal showing a phase transition temperature mentioned in an embodiment, which will be explained hereinlater, can be used.

In case of constructing the devices by using those materials, in order to hold in a temperature state such that the liquid crystal compound has a desired phase, the devices can be supported by a copper block in which a heater is embedded as necessary.

Figure 22:
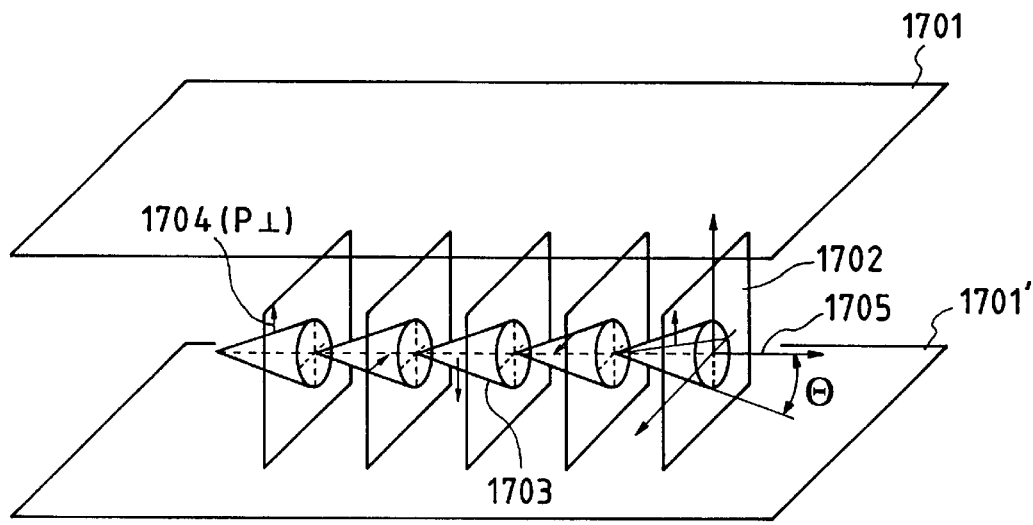
FIG. 22 is a diagram for explaining the operation of a ferroelectric liquid crystal.

FIG. 22 is a diagram schematically showing an example of the cells for explaining the operation of the ferroelectric liquid crystal. The liquid crystal of the SmC* phase will now be described as a desired phase hereinbelow.

In FIG. 22, reference numerals 1701 and 1701' denote boards (glass plates) coated with transparent electrodes made of thin films of $In_2O_3$, $SnO_2$, ITO (Indium-Tin Oxide), or the like. A liquid crystal of the SmC* phase which is oriented so that a liquid crystal molecular layer 1702 is perpendicular to the glass surface is sealed between those glass plates. Reference numeral 1703 shown by a bold line denotes a liquid crystal molecule having a spiral structure which is continuously formed in the plane direction of the board. An angle which is formed by a center axis 1705 of the spiral structure and the axial direction of the liquid crystal molecule 1703 is shown as Θ. The liquid crystal molecule 1703 has a dipole moment (P⊥) 1704 in the direction perpendicular to the molecule. When a voltage of a predetermined threshold value or more is applied across the electrodes on the boards 1701 and 1701', the spiral structure of the liquid crystal molecule 1703 is broken and the liquid crystal molecule 1703 can change the orientation direction so that the whole dipole moment (P⊥) 1704 faces the electric field direction. The liquid crystal molecule 1703 has an elongated shape and exhibits a refractive index anisotropy in the major axis direction and the minor axis direction. Therefore, it will be easily understood that, for example, by arranging polarizers which are mutually crossnicols to the upper and lower positions of the glass surface, a liquid crystal optical device whose optical characteristics change depending on the voltage applying polarity is derived.

Figure 23:
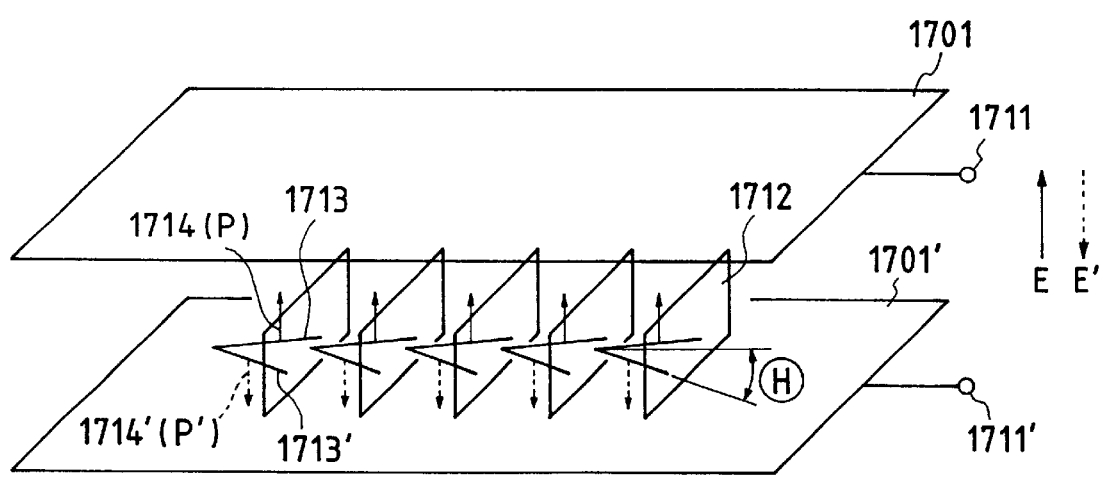
FIG. 23 is a diagram for explaining liquid crystal cells.

A thickness of liquid crystal cell which is preferably used in the liquid crystal optical device of the embodiment can be made sufficiently thin (for example, 10 μm or less). As the liquid crystal layer becomes thin as mentioned above, even in a state in which no electric field is applied as shown in FIG. 23, the spiral structure of the liquid crystal molecule is broken and a non-spiral structure is derived. The dipole moment P or P' has either one of an upper (1714) and lower (1714') states. An angle of ½ of an angle which is formed by the molecule axis of the liquid crystal molecule 1713 and that of a molecule 1713' is called a tilt angle (Θ). The tilt angle (Θ) is equal to ½ of a vertical angle which is formed by a cone when obtaining the spiral structure. When an electric field E or E' of a different polarity of a predetermined threshold value or more is applied to such a cell by electric field applying means 1711 or 1711' as shown in FIG. 23, the dipole moment changes the direction to the upper direction 1714 or lower direction 1714' in correspondence to an electric field vector of the electric field E or E'. In accordance with it, the liquid crystal molecule is oriented to either one of the first stable state 1713 and the second stable state 1713'.

By using such a ferroelectric liquid crystal as a liquid crystal optical device, there is an advantage such that a response speed is extremely high and the orientation of the liquid crystal molecule has a bistability.

According to the embodiment as mentioned above, with respect to the inter-frame image, the change portion for the previous picture plane can be efficiently detected by using the movement data between frames.

With respect to the intra-frame image, by periodically executing the refreshing operation, the deterioration of the display image in the display apparatus of the ferroelectric liquid crystal mentioned above having the memory performance can be prevented.

In the above embodiment, although the codec 518 has been provided separately from the FLC display 514, the codec 518, display interface 511, and FLC display 514 can be also integratedly constructed.

The compressing system is not limited to the foregoing MPEG system but can also use another encoding system for encoding by using a correlation between the frames.

The display is also not limited to the FLC display but can also use another display which can partially rewrite the display image.

The partial rewriting is not limited to the rewriting on a line unit basis but it is also possible to rewrite on a block unit basis.

According to the present invention as mentioned above, the changed portion for the previous picture plane can be efficiently detected from the image data encoded by using a correlation among a plurality of picture planes. The partial image display in the display apparatus can be changed.

By executing the refreshing operation at a timing to display the intra-frame image, the deterioration of the display image in the display apparatus can be prevented.

The present invention is not limited to the foregoing embodiments but many modifications and variations are possible within the spirit and scope of the appended claims of the invention.

What is claimed is:

1. An image processing apparatus comprising:
   an inputter, arranged to input a data stream separately including image data encoded by using a correlation among a plurality of picture planes and motion data indicative of the motion between the plurality of picture planes;
   a detector, arranged to detect a changed portion in a current picture plane by using the motion data; and
   an outputter, arranged to decode the image data and output the image data of the portion detected by said detector to a display apparatus without outputting to the display apparatus the image data of any portion of the current picture plane other than the portion detected by the detector.

2. An apparatus according to claim 1, wherein said image data has been encoded by using an orthogonal transformation.

3. An apparatus according to claim 1, wherein said motion data includes movement vector data.

4. An apparatus according to claim 1, wherein said outputter outputs information indicative of the position of the portion detected by said detector together with said image data.

5. An apparatus according to claim 1, wherein said display apparatus can partially rewrite a display image.

6. An apparatus according to claim 1, wherein said display apparatus is a display apparatus using a ferroelectric liquid crystal.

7. An image processing method comprising:
   an inputting step of inputting a data stream separately including image data encoded by using a correlation among a plurality of picture planes and motion data indicative of the motion between the plurality of picture planes;
   a detecting step of detecting a changed portion in a current picture plane by using the motion data; and
   an output step of decoding the image data and outputting the image data of the portion detected in said detecting step to a display apparatus without outputting to the display apparatus the image data of any portion of the current picture plane other than the portion detected in the detection step.

8. An image processing apparatus comprising:
   an inputter, arranged to input image data encoded by using an intra-picture encoding and an inter-picture encoding;
   a detector, arranged to detect a changed portion in a current picture;
   a decoder, arranged to decode the image data; and
   an outputter, arranged to output the image data of the changed portion detected by said detector to a display apparatus without outputting to said display apparatus the image data of any portion of the current picture other than the changed portion detected by the detector as to the inter-picture encoded image data, and output a predetermined portion of the image data in spite of a detecting result by said detector to said display apparatus as to the intra-picture encoded image data.

9. An image processing apparatus according to claim 8, wherein the image data has been encoded by using an orthogonal transformation.

10. An image processing apparatus according to claim 8, wherein the image data includes movement vector data.

11. An apparatus according to claim 8, wherein said display apparatus can partially rewrite a display image.

12. An apparatus according to claim 8, wherein said display apparatus is a display apparatus using a ferroelectric liquid crystal.

13. An image processing method comprising:
- an inputting step of inputting image data encoded by using an intra-picture encoding and an inter-picture encoding;
- a detecting step of detecting a changed portion in a current picture;
- a decoding step of decoding the image data; and
- an outputting step of outputting the image data of the changed portion detected by said detecting step to a display apparatus without outputting to the display apparatus the image data of any portion of the current picture other than the changed portion detected by the detecting step as to the inter-picture encoded image data, and outputting a predetermined portion of the image data in spite of a detecting result by said detecting step to the display apparatus as to the intra-picture encoded image data.

* * * * *

UNITED STATES PATENT AND TRADEMARK OFFICE
CERTIFICATE OF CORRECTION

PATENT NO. : 6,252,991 B1  
DATED : June 26, 2001  
INVENTOR(S) : Hirokazu Uchio et al.

Page 1 of 1

It is certified that error appears in the above-identified patent and that said Letters Patent is hereby corrected as shown below:

<u>Column 3,</u>  
Line 29, "herein" should read -- herein --; and  
Line 31, "video tape recorder" should read -- Video Tape Recorder --.

Signed and Sealed this

Ninth Day of April, 2002

*Attest:*

JAMES E. ROGAN  
*Director of the United States Patent and Trademark Office*

*Attesting Officer*